United States Patent [19]

Fricker et al.

[11] 4,224,495

[45] Sep. 23, 1980

[54] ELECTRICAL DISCHARGE MACHINING APPARATUS WITH COMPOUND ELECTRODE MOVEMENT

[75] Inventors: Paul Fricker; Gottfried Vogler, both of Locarno; Hans-Rudolf Knecht, Lugano; Giampaolo Pierobon, Cadempino; Bernd Schumacher; Arnold Zimmerman, both of Losone, all of Switzerland

[73] Assignee: A.G. für industrielle Elektronik AGIE Losone b. Locarno, Losone, Switzerland

[21] Appl. No.: 860,184

[22] Filed: Dec. 13, 1977

[30] Foreign Application Priority Data

Dec. 17, 1976 [CH] Switzerland ...................... 15917/76
Jul. 27, 1977 [CH] Switzerland ........................ 9297/77

[51] Int. Cl.² ............................................. B23P 1/12
[52] U.S. Cl. ............................................... 219/69 V
[58] Field of Search ................ 219/69 V, 69 M, 69 E, 219/69 R, 69 G, 69 W, 125.1, 125.12; 90/15 A, 15 B

[56] References Cited

U.S. PATENT DOCUMENTS

| 3,135,852 | 6/1964 | Bentley et al. | 219/69 V |
| 3,809,852 | 5/1974 | Weber | 219/69 V |
| 3,919,516 | 11/1975 | Ullmann et al. | 219/69 V |
| 4,104,500 | 8/1978 | Wyss | 219/69 V |

FOREIGN PATENT DOCUMENTS

| 844142 | 6/1970 | Canada | 219/69 V |
| 1051540 | 12/1966 | United Kingdom | 219/69 V |

Primary Examiner—B. A. Reynolds
Assistant Examiner—Clifford C. Shaw
Attorney, Agent, or Firm—Frishauf, Holtz, Goodman & Woodward

[57] ABSTRACT

A movement control apparatus, which can be constructed as an accessory, provides in addition to the primary process-controlled movement of the electrode circular a secondary movement. The secondary movement is imparted to the electrode through a drive arm fixed at one end to the bottom slide of a cross-slide on which the electrode is also fixed and attached pivotably at the other end to an eccentric point of a rotating spindle. The mechanism for rotating the spindle is so designed that the degree of eccentricity of the eccentric point may be adjusted mechanically while the spindle is rotating. The eccentricity may also be controlled by the action of a cam follower which runs along a template, so that the circular movement of the electrode is controlled by the template in a copying mode. Further described are means for deflecting the primary process-controlled movement of the electrode to the secondary movement, so that the secondary movement can be process-controlled by the existing control mechanisms of the machine.

The present invention relates generally to apparatus for spark erosion machining, also known as EDM (Electrical Discharge Machining). It relates particularly to EDM apparatus with the capability of supplementing the main, primary movement between the tool electrode and the workpiece with a secondary movement, such as one transverse to the primary movement.

6 Claims, 7 Drawing Figures

ELECTRICAL DISCHARGE MACHINING APPARATUS WITH COMPOUND ELECTRODE MOVEMENT

BACKGROUND AND PRIOR ART

The erosion process of an EDM machine takes place at any point where the tool electrode and workpiece have a sufficiently narrow machining gap.

It is known that by supplementing the primary motion between the tool and the workpiece with a secondary relative movement, such as a transverse movement, it is in some cases possible to reduce the number of electrodes required for some machining operations. Furthermore, it is then also possible to produce certain complex geometries by using only electrodes of a relatively simple geometry.

It is also known that by deflecting the process-controlled primary movement of an EDM machine to a secondary relative movement direction, the secondary relative movement can conveniently be also process-controlled by the already existing control mechanisms.

It is a problem with presently available apparatus of the type described above that it is relatively bulky and because it in many instances requires the attachment of additional, auxiliary devices, is difficult to adapt for the machining of complex geometries, particularly complex geometries which are to be reproduced with the use of relatively simple electrodes.

THE INVENTION

It is an object to provide apparatus which combines within a compact, attachable device the possibility of superimposing on the primary movement of the EDM machine various secondary movements which can be process-regulated, and which preferably is particularly suited for accurately reproducing complex geometries with electrodes of relatively simple geometries.

In the apparatus a differential gear is used together with planet wheels, worm wheels, or a duct rod with declutching intermediate bearings. This permits the superimposing of various movements. An additional movement, itself dependent on the process regulation, can be superimposed on the main erosion movement with the aid of a copying tracer guided on a template, with the copying process taking place as a function of the casing moving together with the regulated servo-movement. According to a variant, the drive on the copying tracer can also be an automatic servo-drive, e.g. a servo-regulated stepping motor, which is able to control or process-regulate the superimposed movement.

By variations in the copying system and in the operation of the various movement functions, a multiplicity of machining functions can be solved in practice; this usually leads to a considerable saving of electrode costs. Through having the additional movement indirectly driven by the regulated main movement of the system, a device is obtained which, like an accessory, can be easily fitted and detached, so that it can be readily adapted to differing systems.

DETAILED DESCRIPTION OF THE PREFERRED EMBODIMENTS

Figure 1:
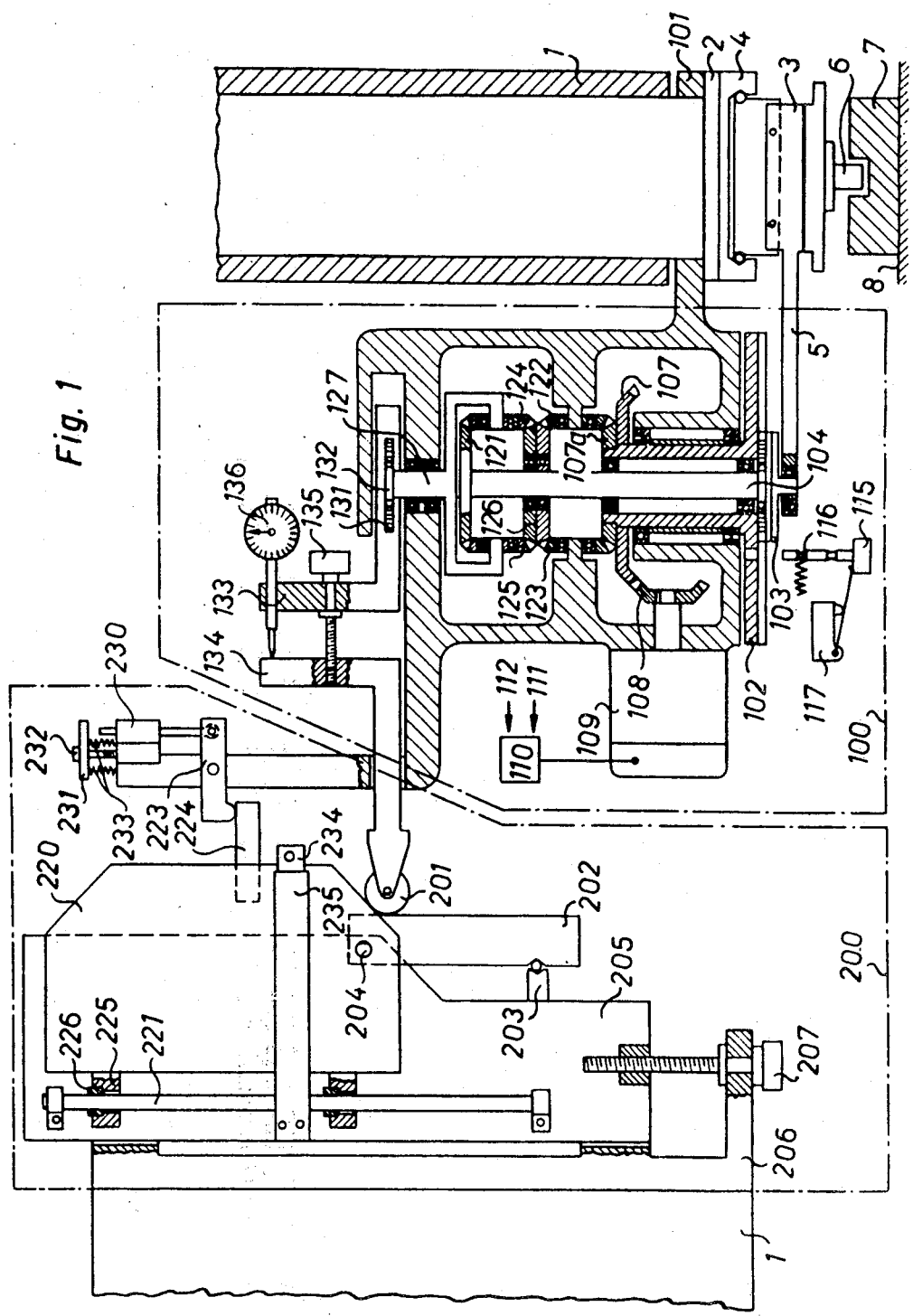
FIG. 1 is a partially sectioned view of an apparatus in accordance with a preferred embodiment of the present invention, showing the overall kinematic relationships of the apparatus and its working connection with the erosion system.
Figure 2:
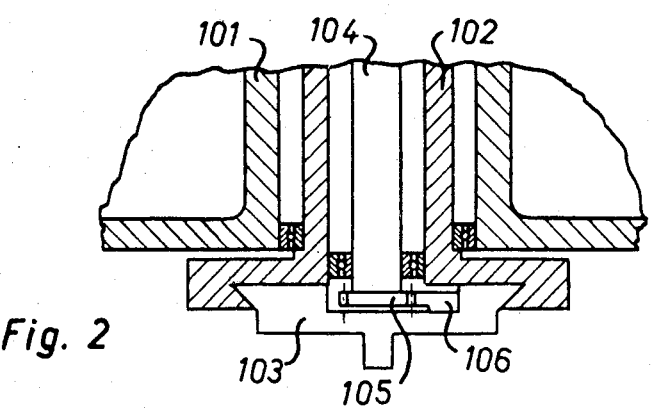
FIG. 2 is a partially sectioned view of a portion of the apparatus of FIG. 1, showing in more detail a linking feature for linking a copying movement to the main movement of the erosion system.

Since the general construction of a spark erosion system itself is known, it is only schematically illustrated in part in FIG. 1. A spindle sleeve 2 is guided in the work head 1 of such a system and effects the process-regulated main drive for the machining process. The erosion process lowers electrode 6 into a machined workpiece 7 which is fixed in the necessary aligned position on work table 8 of the machine. To the front surface of spindle sleeve 2 is fixed a small cross-slide 4 which on its lower slide 3 has a lateral deflector 5, to which is supplied the additional movement. Apparatus 100 with its casing 101 is also fixed to sleeve 2 and is generally moved by the latter. Within casing 101 is mounted a spindle 102, whose one end projects with a flange from the apparatus and at that point has a graduation for indicating its twist or rotary angle. To the same end of the spindle is fixed an adjusting slide 103 which engages with a cam in deflector 5 for the motion drive via a bearing. FIG. 2 also shows how slide 103 is arranged coaxially movable in spindle 102, which is in turn mounted in the supporting casing 101. During operation, slide 103 can be adjusted by means of a shaft 104 passed through the centre of spindle 102, e.g. via a rack 106 and a pinion 105 (FIG. 2), or by other means such as an adjusting cam relative to a spring or a mechanically stressed looping band.

Spindle 102 carrying the adjustable slide 103 can be driven in apparatus 101 through pinions 107, 108 by an electric motor 109. In order to be able to easily adjust the rotation speed of the spindle in accordance with technical requirements, drive 109 preferably comprises a direct current motor operated by a control device 110. Control device 110 has an input 111, by means of which the rotation speed can be pre-selected, e.g. by a motor speed control, and has a second input 112 by means of which the rotation speed can be modified in pre-set limits as a function of the process. If the average gap speed between tool electrode 6 and workpiece 7 exceeds a threshold value, the rotary movement is accelerated by input 112. This threshold value is adjustable. A high average voltage at the discharge path generally represents a no-load condition in which the pulses supplied by the generator do not lead to discharges. Correspondingly, in the case of such a condition there is a poor power factor. The purpose of this control is to avoid power losses which are characteristic of the movements superimposed upon a main eroding movement. This is briefly explained with reference to FIG. 3.

Figure 3:
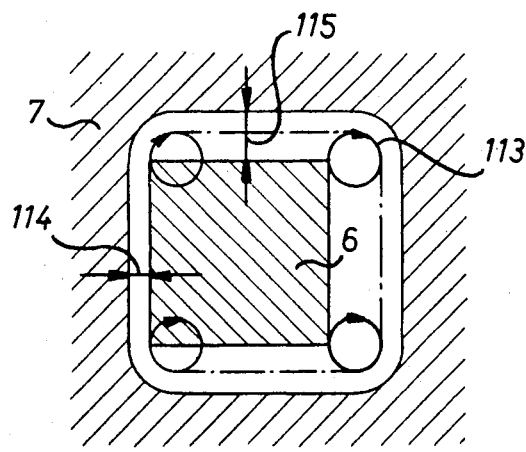
FIG. 3 is a crossectional schematic for illustrating the relative movement between the tool electrode and the workpiece.

FIG. 3 schematically, and to an enlarged scale, shows a horizontal section through an arrangement of an electrode 6 in a depression in a workpiece 7. The electrode which is moved by the spindle sleeve in the main lowering direction perpendicularly into the plane of projection in the present embodiment performs a circular additional movement, which is indicated and controlled by the attached apparatus. In the represented momentary position the electrode 6 is deflected to the left, so that in the machined recess the smallest machining gap 114 is formed in a relative positioning of the electrode surface to the workpiece surface and that momentarily the erosion takes place at this point. If the movement of electrode 6 is uniformly continued with the circular motion, the machining gap at point 114 becomes larger. Momentarily, discharges can then only take place along the corner of the electrode at the upper left until the machining gap 115 has been reduced to such an extent that erosion along the surface areas between the electrode 6 and workpiece 7 occurs. The working cycle alternates correspondingly over the remaining lateral surfaces of the recess. After a short erosion period, the condition will be such that all the material has been removed from the corners, whereas the larger volume is only removed very slowly from the surfaces in view of the limited residence time. Thus, the additional movement leads to a permanent interchange between erosion state and no-load state. If the circulating speed is now correspondingly changed in accordance with the described processes using electrical control 110, a more uniform erosion performance can be produced by increasing the residence time of the electrodes in front of the surfaces, whereas the movement over the corner areas is faster.

Naturally, the main servo-mechanism which drives the feed sleeve is also influenced by the fluctuating engagement, and consequently the fluctuating erosion signal. In conjunction with these controls, it is therefore also necessary to limit the vertical stroke of the machine sleeve, which can take place by the stepwise adjustment of the depth limit switch or by digital presetting with conventional transducers.

In order to be able to superimpose an additional drive for slide 103 by shaft 104 on the rotary movement of spindle 102 when using the apparatus, a double differential gear, comprising differential wheels, 121, 122, 123, 124, 125, 126 and 107a is provided at the other end of spindle 102, as shown in FIG. 1. Driving wheel 107a is fixed to spindle 102 and rotates with the latter. Planet wheels 122, 123 are fixed in the casing, while the second pair of planet wheels is jointly carried by the boss of a shaft 127. It is also possible in each case to use only one planet wheel. Conversely, it is possible to use more than two planet wheels. The two groups of planet wheels are interconnected via the freely movably mounted wheels. By rotating shaft 127, a movement can be initiated on differential wheel 121 via its boss and the planet wheels 124, 125 carried thereby, to move the shaft 104 for the adjustment of slide 103. This initiation of movement can take place during the driving of spindle 102 or while it is stationary by drive motor 109 via wheels 108 and 107. The rotation of shaft 104, corresponding to the rotation of shaft 127, displaces slide 103 mounted in spindle 102, and thus causes the adjustment of deflector 5, which correspondingly adjusts the cross-slide fixed to the spindle sleeve of the erosion system.

An inoperative position of spindle 102 can be brought about by locking it in a desired rotation position. It can be held in fixed, indexed positions by means of mandrel 115, which has a ball notch 116. Electrical locking with a limit switch 117 prevents the motor 109 from being started when spindle 102 is secured by the locking apparatus.

In order to be able to bring about a change in the relative position between tool electrode 6 and workpiece 7 during machining by means of the apparatus, there is located at the top of apparatus 101 a copying tracer which can bring about the adjustment of slide 103 in spindle 102 with the aid of shaft 127 via the differential. For example, as shown this drive can be provided by a rack 131 and a pinion 132, whereby rack 131 is fixed to a displaceably mounted copying tracer 133. In order to adjust the initial position for planned machining, the tracer arm 134 is adjustable by a screw 135. This adjustment can be controlled by a precise dial gauge 136.

The template 202, against which the copying tracer works with its tracer roll 201, is placed on a template apparatus 200 having a support secured to the work head 1 of the machine. Template apparatus 200 has a holder 206, on which is arranged an adjustable slide 205 with adjusting means 207, e.g. a screw, so that template 202, which is fixed thereto, can be adjusted in accordance with the height of the spindle sleeve 2 in such a way that the initial position for the machining between workpiece 7 and tool electrode 6 can be sychronized with the start of the copying movement or the introduction of the superimposed additional movement. Template 202 can be arranged on slide 205, e.g. fixed to a mandrel 204, and can be set in the corresponding inclined positions in the manner of a sine bar rule by using end blocks 203. It is obviously also possible to use for this purpose screw means, and the template need not be a rule. It can instead have a configuration corresponding to the geometry to be produced, whereby the dimensions of the tracer rolls must also be taken into consideration. When the apparatus is being used, the machining of a recess in workpiece 7 with the aid of the tool electrode 6 can take place in such a way that after a first rough machining, further finish machining operations can take place with additional deflection of the electrode by the amount of the finish allowance. The lateral deflections can be in a chosen transmission ratio to the feed in the main lowering direction, since the template 202 is angularly adjustable. The possibility of leaving the electrode in the rough machined bore, followed by gradual lateral finishing, provides the technological advantage that wear is better distributed. In certain circumstances, the process can even be technologically favorably influenced by the intensified scavenging action linked with the movement.

Figure 5:
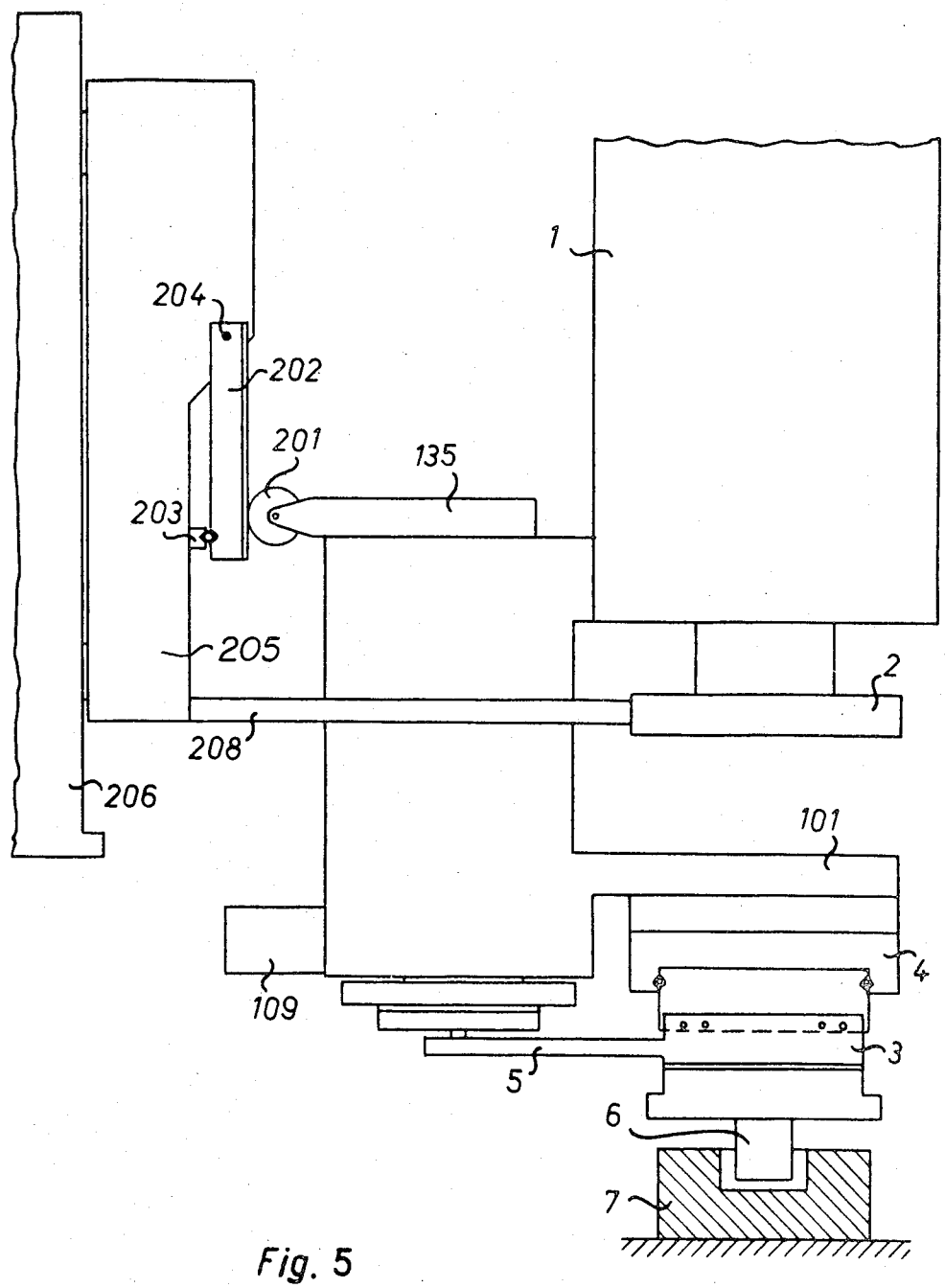
FIG. 5 is a partially sectioned, partially schematic view of an apparatus in accordance with the present invention and which includes a reverse drive.

The use of the apparatus as described above becomes increasingly difficult the greater the emphasis is on lateral deflection, as opposed to feed in the main lowering direction. However, through kinematic reversal in use, it is possible in the manner shown in FIG. 5 to perform a purely horizontal servo-machining with the apparatus, in which the original depression of the spindle sleeve is completely eliminated. As shown in FIG. 5, for this purpose casing 101 is fixed to the work head, and not to the sleeve, while the template slide 205 is linked with the sleeve movement via connection 208. The normal vertical lowering movement of the spindle sleeve 2 is converted into a process-regulated, horizontal lateral additional movement of tool electrode 6 via connection 208, template slide 205, template 202 and copying tracer 135.

When using the above-described apparatus, a technological disadvantage persists in the case of process faults in that the primary return movement of the electrode which is initiated upon the occurence of a process fault takes place along the previously worked surface portion as predetermined by the copying system. That is, the erosion gap located laterally of the electrode is not enlarged to clear it of arcing. By means of a second template on the template 200, it can be ensured that in the case of a process fault and a corresponding return stroke of the spindle sleeve in the work head tool, electrode 6 is always retracted to the centre of movement in the recess in workpiece 7. This also applies with respect to the superimposed additional movement. As shown in FIG. 1, for this purpose a second template 220 is fitted to a suitable guiding system 221 with guides 225 which, according to one construction, have self-locking devices 226 permitting the movement of the template in the set position relative to the main copying template 202 by a cam 223 fixed on casing 101, so that in the case of a process fault and return regulation of the spindle sleeve with a corresponding return movement of casing 101, copying tracer roll 201 must follow the path prescribed by the second template for the return movement. The second template can also be controlled in some other way, so that machining with tool electrode 6 in workpiece 7 always only takes place laterally. As a result, the edges and corners in the lowering direction are not subject to wear. To this end, template 202 is advanced by adjustable amounts with the aid of a e.g. magnetic stepping drive 230 via a lug cam 231, whereby the amounts can be pre-set by the stroke limiting stop 231 with setscrew 232 and counter-pressure spring 233.

Figure 4:
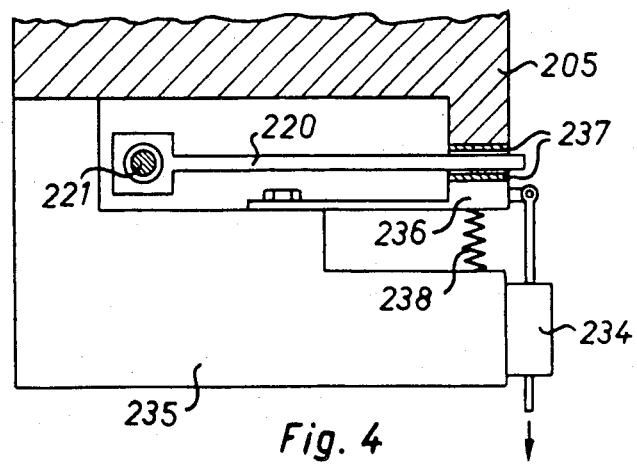
FIG. 4 is a partially sectioned view of a fragment of the apparatus with a clamping device for a process-dependent adjustable template.

The apparatus operates in such a way that via the forced-back copying tracer the second template initially sets a small eccentricity of the superimposed additional movement, followed by erosion until the copying tracer reaches main template 202. This moment can be indicated e.g. with electrical sensors and initiates in each case a new step for the second template, which then leads to a corresponding new working cycle. Naturally, it is then necessary to lock the second template 220 in the intermediate phases, this being carried out with a device according to FIG. 4. On guide rod 221, the second template 220 is surrounded by a clamping holder 235 which is fixed to the template slide 205. On the clamping holder 235 are located clamping jaws 236 which clamp the second template 220 with the aid of spring tension 238 between brake linings 237. When it is necessary to adjust the second template, the clamping action is discontinued in opposition to the spring tension with the aid of a lifting device, a solenoid 234.

Figure 6:
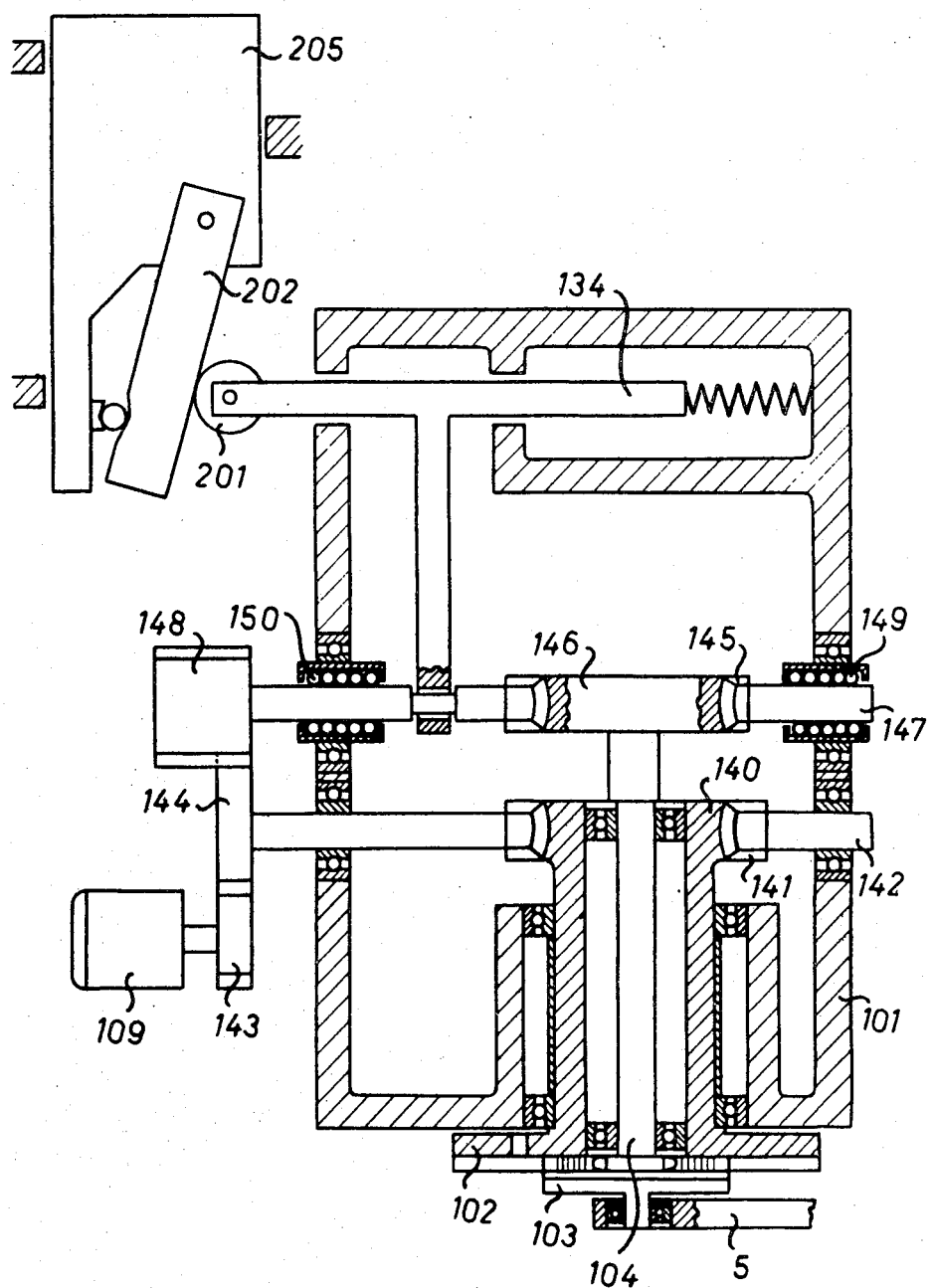
FIG. 6 is a partially sectioned view of an apparatus in accordance with an alternative embodiment of the present invention and which utilizes a differential worm gear.

FIG. 6 shows an alternative construction for the apparatus, compared with that described in FIG. 1, using a differential worm gear. Once again, at the end of spindle 102 there is a gear wheel, in this case a worm wheel 140 driven by the pinion 143 and the gear 144 of motor 109 by means of worm 141 via shaft 142. A further pair of worm wheels 145, 146 is driven synchronously with worm shaft 142 by shaft 147 via a particularly wide pinion 148. The driving shaft for the second worm 145 is displaceably mounted in longitudinal bearings 149, 150 and can be displaced by the copying slide 134 for initiating a superimposed movement on shaft 104. Such a construction is particularly suitable if a servo-drive is operated directly on shaft 147, e.g. in the form of a servo-cylinder in place of the copying mechanism 201, 202, 205.

Figure 7:
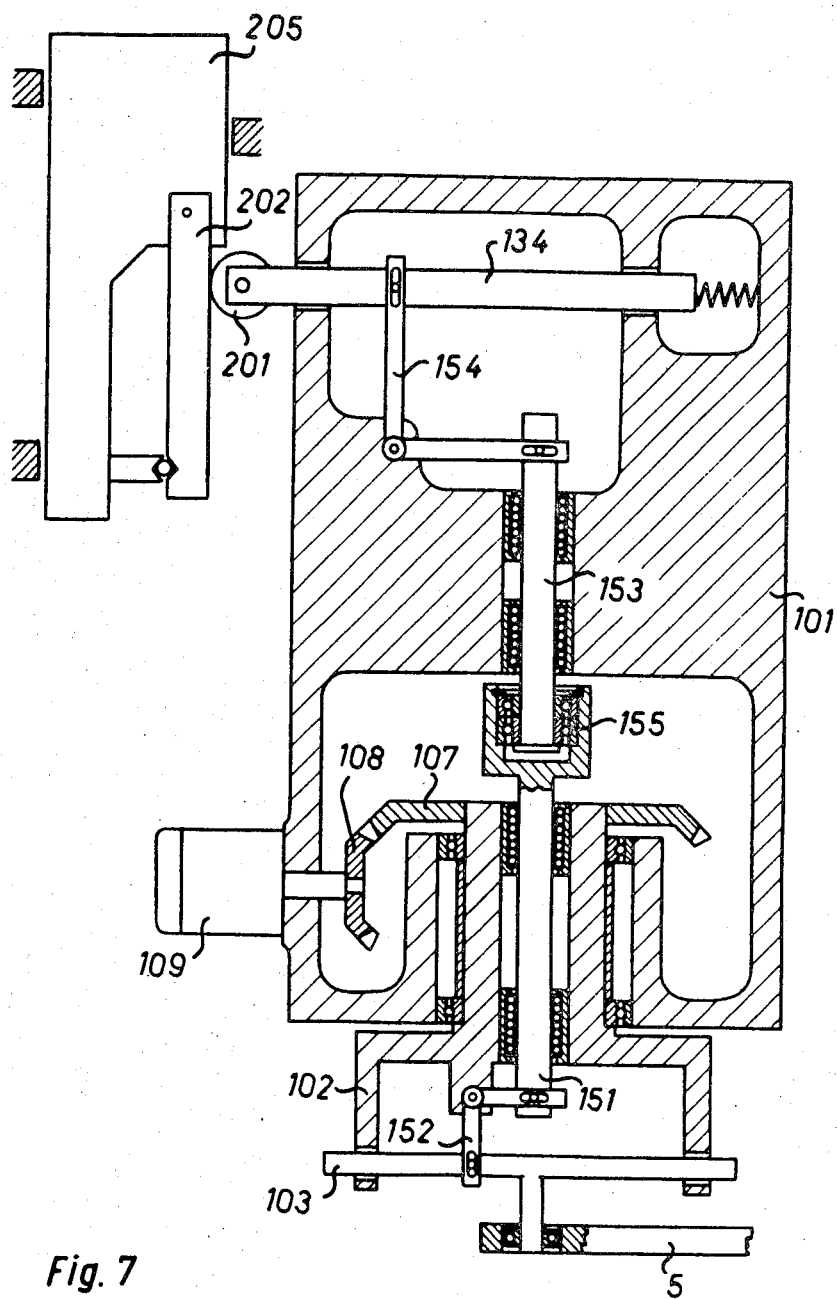
FIG. 7 is a partially sectioned view of an apparatus in accordance with still another alternative embodiment of the present invention and utilizing a transmission by rods and declutching bearings.

Like FIG. 6, FIG. 7 shows a further alternative for construction of the apparatus described relative to FIG. 1. As in FIG. 1, spindle 102 is driven by motor 109 via wheels 108, 107 and once again carries slide 103, but which is in this case displaced by means of e.g. a toggle lever 152 by a linkage 151 which is longitudinally displaceable along the bearings. By means of declutching bearing 155, linkage 151 is otherwise only axially coupled to a second linkage 153. The second linkage is once again longitudinally displaceable in the bearing and, in response to the initiated copying slide 134, can once again transfer the adjustment of the copying slide to an analogous adjustment of the slide 103, e.g. with the aid of a toggle lever 154. This can take place with drive 109 running or stationary. Instead of using a toggle lever as the transmission member, it is also possible to use band loops or a tooth system, whereby it is possible to provide a selectable or adjustable transmission ratio in the same way as for the lever.

We claim:

1. Electrical discharge machining apparatus of the type in which a discharge electrode (6) has more than one controlled movement with respect to a workpiece (7) superimposed thereon, the process regulation for the additional superimposing movement being derived from control of the main erosion process movement, comprising means coupled to the electrode producing a planetary relative movement and an eccentric relative movement between the two electrodes (6) and the workpiece;

process control means (110) electrically controlling the rotary speed of the planetary movement;

and means (200) including a template (202) shaped for process controlling the eccentric movement of the electrode separately from the rotary speed control means wherein said means controlling the eccentric movement of the electrode comprises a first template (202) controlling the eccentric movement of the discharge electrode in dependence on the main erosion movement;

a second template (220) shaped to control retraction of the discharge electrode in the center of its main erosion movement;

and means (223, 224) placing said second template in operative condition in case of process disturbance or fault during operation of the apparatus.

2. Apparatus according to claim 1, wherein the first template (202) is shaped to control the eccentric movement of the electrode (6) in dependence on the main erosion movement of the discharge electrode (6).

3. Apparatus according to claim 1, further comprising an electrode housing (101) within which the discharge electrode (6) is secured and carrying out the main erosion movement;

and a template follower (201) secured to said housing and in sensing contact with respective templates (202, 220).

4. Apparatus according to claim 1, including a fixed working head (1);

a discharge electrode carrier (2) carrying out the main erosion movement of the discharge electrode and movable with respect to said working head;

a gearing housing (101) including a differential gearing (107, 108, 121, 122, 123, 125) therein, the gearing housing being secured to the working head, the differential gearing having an output (103) coupled to the electrode (6);

and wherein the means (200) controlling the eccentric movement of the electrode comprises template controlled movable means connected to the discharge electrode carrier.

5. Attachment apparatus for an electrical discharge machining (EDM) apparatus of the type in which a discharge electrode (6) has a main erosion movement applied thereto and includes an electrode carrier (2) carrying out the main erosion movement and a fixed working head (1), said attachment apparatus comprising a housing (101);

a differential gearing (102, 108, 121, 122, 123) located within the housing and having an output (103) coupled to the discharge electrode (6), the housing (101) for the gearing being secured to the discharge electrode carrier (2);

the attachment apparatus further including a template means (200) controlling eccentric movement of the electrode separately from the differential gearing and being secured to the working head (1) of the EDM apparatus wherein said means controlling the eccentric movement of the electrode comprises a first template (202) controlling the eccentric movement of the discharge electrode in dependence on the main erosion movement;

a second template (220) shaped to control retraction of the discharge electrode in the center of its main erosion movement;

and means (223, 224) placing said second template in operative condition in case of process disturbance or fault during operation of the apparatus.

6. Attachment according to claim 5 wherein the first template (202) is shaped to control the eccentric movement of the electrode (6) in dependence on the main erosion movement of the discharge electrode (6).

* * * * *